US00RE50239E

(19) United States
(12) Reissued Patent
Drevon et al.

(10) Patent Number: US RE50,239 E
(45) Date of Reissued Patent: Dec. 17, 2024

(54) ENHANCEMENTS TO SERVING A USER EQUIPMENT IN A VISITED COUNTRY IN A MOBILE COMMUNICATION SYSTEM

(71) Applicant: Nokia Technologies OY, Espoo (FI)

(72) Inventors: Nicolas Drevon, Nozay (FR); Laurent Thiebaut, Antony (FR); Bruno Landais, Lannion (FR)

(73) Assignee: NOKIA TECHNOLOGIES OY, Espoo (FI)

(21) Appl. No.: 17/665,081

(22) Filed: Feb. 4, 2022

Related U.S. Patent Documents

Reissue of:
(64) Patent No.: 10,555,158
Issued: Feb. 4, 2020
Appl. No.: 16/069,746
PCT Filed: Jan. 12, 2017
PCT No.: PCT/EP2017/050587
§ 371 (c)(1),
(2) Date: Jul. 12, 2018
PCT Pub. No.: WO2017/121812
PCT Pub. Date: Jul. 20, 2017

(30) Foreign Application Priority Data

Jan. 14, 2016 (EP) ..... 16305032

(51) Int. Cl.
*H04W 12/80* (2021.01)
*H04L 9/40* (2022.01)
(Continued)

(52) U.S. Cl.
CPC ..... *H04W 12/80* (2021.01); *H04L 61/4511* (2022.05); *H04L 63/164* (2013.01);
(Continued)

(58) Field of Classification Search
CPC ... H04W 84/12; H04W 84/042; H04W 12/80; H04W 48/18; H04W 76/12; H04W 48/16;
(Continued)

(56) References Cited

U.S. PATENT DOCUMENTS 8,706,084 B2 * 4/2014 Qiang ..... H04L 63/0892 455/411
9,867,098 B2 * 1/2018 Kwok ..... H04L 65/80
(Continued)

FOREIGN PATENT DOCUMENTS

CN 101622895 A 1/2010
CN 102752830 A 10/2012
(Continued)

OTHER PUBLICATIONS

Office Action for Philippine Application No. 1/2018/501513 dated May 6, 2022, 4 pages.
(Continued)

*Primary Examiner* — C. Michelle Tarae
(74) *Attorney, Agent, or Firm* — ALSTON & BIRD LLP

(57) ABSTRACT

An embodiment of the invention is a User Equipment UE, configured to:

get ePDG selection information configured by the UE's HPLMN, said ePDG selection information including a list of PLMNs with an indication of whether the selection of an ePDG in a PLMN is preferred or mandatory or non-preferred, perform selection of an ePDG operated by a PLMN of a country the UE is located in, referred to as local PLMN, which has roaming agreement with the UE's HPLMN for untrusted WLAN access to EPC, based on said list of PLMNs configured in said ePDG selection information, and on a list of MCCs of said country and/or a list of local PLMNs.

10 Claims, 2 Drawing Sheets

(51) Int. Cl.

| | |
|---|---|
| ***H04L 61/4511*** | (2022.01) |
| ***H04W 4/90*** | (2018.01) |
| ***H04W 8/08*** | (2009.01) |
| ***H04W 48/00*** | (2009.01) |
| ***H04W 48/16*** | (2009.01) |
| ***H04W 48/18*** | (2009.01) |
| ***H04W 76/12*** | (2018.01) |
| ***H04W 84/04*** | (2009.01) |
| ***H04W 84/12*** | (2009.01) |

(52) U.S. Cl.
CPC ..... *H04W 4/90* (2018.02); *H04W 8/08* (2013.01); *H04W 48/16* (2013.01); *H04W 48/17* (2013.01); *H04W 48/18* (2013.01); *H04W 76/12* (2018.02); *H04W 84/042* (2013.01); *H04W 84/12* (2013.01)

(58) Field of Classification Search
CPC ..... H04W 4/90; H04W 48/17; H04W 8/08; H04L 61/4511; H04L 63/164
See application file for complete search history.

(56) References Cited

U.S. PATENT DOCUMENTS

| | | | | |
|---|---|---|---|---|
| 2007/0213050 | A1 | 9/2007 | Jiang | |
| 2008/0186903 | A1 | 8/2008 | Hedberg et al. | |
| 2009/0156253 | A1 | 6/2009 | Shi et al. | |
| 2010/0054222 | A1 | 3/2010 | Rune | |
| 2011/0261787 | A1 | 10/2011 | Bachmann et al. | |
| 2012/0260927 | A1 | 10/2012 | Liu | |
| 2012/0322412 | A1* | 12/2012 | Qiang | H04W 12/06 455/411 |
| 2012/0322413 | A1 | 12/2012 | Haddad et al. | |
| 2014/0079049 | A1 | 3/2014 | Friman et al. | |
| 2014/0153559 | A1 | 6/2014 | Roeland | |
| 2014/0366898 | A1 | 12/2014 | Monsees et al. | |
| 2015/0334644 | A1 | 11/2015 | Kim et al. | |
| 2016/0295386 | A1* | 10/2016 | Faccin | H04W 4/029 |
| 2017/0005914 | A1* | 1/2017 | Edge | H04W 8/082 |
| 2017/0188398 | A1* | 6/2017 | Youn | H04W 8/12 |
| 2018/0091967 | A1 | 3/2018 | Gupta | |

FOREIGN PATENT DOCUMENTS

| | | | |
|---|---|---|---|
| CN | 102960031 | A | 3/2013 |
| CN | 107637160 | A | 1/2018 |
| EP | 2 194 686 | A1 | 6/2010 |
| JP | 2012510755 | A | 5/2012 |
| RU | 2317646 | C2 | 2/2008 |
| RU | 2375846 | C2 | 12/2009 |
| WO | WO 2007/016447 | | 2/2007 |
| WO | WO 2007/016447 | A2 | 2/2007 |
| WO | WO-2012096603 | A1 | 7/2012 |
| WO | WO-2012/168146 | A1 | 12/2012 |
| WO | WO 2014/129794 | A1 | 8/2014 |
| WO | WO-2015003125 | A2 | 1/2015 |
| WO | WO 2016/161404 | | 10/2016 |
| WO | WO 2016/161404 | A1 | 10/2016 |

OTHER PUBLICATIONS

Notice of Allowance for Indonesian Application No. PID201805197 dated Jan. 21, 2022, 4 pages.
3GPP TS 23.003 V13.4.0, 3rd Generation Partnership Project; Technical Group Core Network and Terminals; Numbering, addressing and identification (Release 13), 3GPP TS 23.003 V13.4.0, Dec. 17, 2015, 19.4.2.9 Section, 100 pages.
3GPP TS 24.234 V12.2.0, 3rd Generation Partnership Project; Technical Specification Group Core Network and Terminals; 3GPP System to Wireless Local Area Network (WLAN) interworking; WLAN User Equipment (WLAN UED) to network protocols; Stage 3 (Release 12) (Mar. 2015) 40 pages.
Additional ePDG selection considerations and corrections, 3GPP TSG-CT WG1395bis, C1-160125, Alcatel-Lucent, Alcatel-Lucent Shanghai Bell, Jan. 6, 2016.
Corrections to ePDG selection procedure, Alcatel-Lucent, Alcatel-Lucent Shanghai Bell, S2-154188 (Nov. 2015), 5 pages.
Discussion on ePDG selection in support of Lawful Interception, Alcatel-Lucent, Alcatel-Lucent Shanghai Bell, Verizon (C1-154346) Nov. 2015) 3 pages.
ePDG selection enhancements related to LI requirements, S2-160185, Alcatel-Lucent, 3GPP TSG-SA WG2#113 S2-160185, Jan. 19, 2016, 4 pages.
ePDG Selection, C1-151936, 3GPP TSG CT WG1 Meeting #92, Qualcomm Incorporated (May 2015), 4 pages.
LS on ePDG Selection Versus LI Requirements, TSG SA Meeting #SP-70, SP-150831 (Dec. 2015), 2 pages.
Reply LS on ePDG Selection, C1-154059, SAE-LI, 3GPP TSG-CT WG1 Meeting #95 (Nov. 2015) 2 pages.
Support For VPLMN Provided WLAN Service Providers, Research In Motion Ltd., UK, S2-132423 (Jul. 2013), 10 pages.
Visiting network configuration for ePDG selection, C1-154347, Alcatel-Lucent, Alcatel-Lucent Shanghai Bell, 3GPP TSG-CT WG1 Meeting #95 (Nov. 2015) 9 pages.
Office Action for Canadian Application No. 3,011,195 dated Apr. 15, 2019, 4 pages.
Office Action for Canadian Application No. 3,011,195 dated Sep. 21, 2020, 3 pages.
Office Action for Chinese Application No. 201780016502.5 dated May 29, 2020, including Search Report dated May 22, 2020, 11 pages.
Decision to Grant for Chinese Application No. 201780016502.5 dated Jan. 25, 2021, 3 pages.
Extended European Search Report for European Application No. 20169433.8 dated May 28, 2020, 10 pages.
First Examination Report for Indian Application No. 201817030325 dated Apr. 30, 2020, 7 pages.
Office Action for Indonesian Application No. PID 2018 05197 dated Aug. 9, 2019, 4 pages.
Office Action for Indonesian Application No. PID201805197 dated Aug. 6, 2021, 4 pages.
International Search Report for Application No. PCT/EP2017/050587 dated Jul. 14, 2017, 8 pages.
Office Action for Japanese Application No. 2018-536780 dated Jun. 28, 2019, 6 pages.
Search Report for Japanese Application No. 2018-536780 dated Jun. 20, 2019, 19 pages.
Written Opinion for Japanese Application No. 2018-536780 dated Dec. 6, 2019, 6 pages.
Decision to Grant for Japanese Application No. 2018-536780 dated Apr. 27, 2020, 5 pages.
Office Action for Japanese Application No. 2020-118280 dated Sep. 21, 2021, 4 pages.
Decision to Grant for Japanese Application No. 2020-118280 dated Apr. 19, 2022, 5 pages.
Office Action for Malaysian Application No. PI 2018001284 dated Apr. 12, 2021, 3 pages.
Office Action for Mexican Application No. MX/a/2018/008666 dated Feb. 27, 2020, 5 pages.
Office Action for Philippine Application No. 1/2018/501513 dated Dec. 7, 2021, 4 pages.
Decision to Grant for Russian Application No. 2018125956/08 dated Nov. 18, 2019, 11 pages.
Decision to Grant and Search Report for Russian Application No. 2020101744/08 dated Sep. 18, 2020, 14 pages.
Office action for Singapore Application No. 11201805984Q dated Dec. 20, 2019, 7 pages.
Notice of Eligibility for Grant for Singapore Application No. 11201805984Q dated Dec. 28, 2020, 5 pages.
Office Action for Singapore Application No. 10202102016W dated Apr. 27, 2022, 6 pages.

(56) References Cited

OTHER PUBLICATIONS

Office Action for U.S. Appl. No. 16/069,746 dated Feb. 27, 2019.
Notice of Allowance for U.S. Appl. No. 16/069,746 dated Sep. 20, 2019.
Office Action for U.S. Appl. No. 16/718,968 dated Jan. 21, 2020.
Notice of Allowance for U.S. Appl. No. 16/718,968 dated May 20, 2020.
Notice of Allowance for U.S. Appl. No. 16/718,968 dated Aug. 11, 2020.
Office Action for Vietnamese Application No. 1-2018-03359 dated Sep. 20, 2018, 2 pages.
Office Action for Mexican Application No. MX/a/2021/001047 dated Feb. 16, 2022, 5 pages.
Alcatel-Lucent et al., "FQDN for ePDG Selection (for non-emergency bearer services)", 3GPP TSG CT4 Meeting #70bis, C4-151712, (Oct. 12-16, 2015), 3 pages.
Extended European Search Report for European Application No. 22206196.2 dated Feb. 22, 2023, 10 pages.
Hearing Notice for Indian Application No. 201817030325 dated Nov. 7, 2023, 2 pages.
Notice of Allowance for Malaysia Application No. PI 2018001284 dated Sep. 5, 2023, 1 page.
Notice of Allowance for Philippine Application No. Jan. 2018/501513 dated Sep. 13, 2022, 2 pages.
Notice of Issuance for Mexico Application No. MX/a/2018/008666 dated Nov. 13, 2020, 6 pages.
Notice of Issuance for Mexico Application No. MX/a/2021/001047 dated Aug. 22, 2022, 6 pages.
Office Action for Brazil Application No. BR112018014343-0 dated Oct. 27, 2023, 8 pages.
Office Action for Chinese Application No. 202110375601.0 dated Oct. 19, 2023, 10 pages.
Rogers Communications, "ePDG Selection When UE Is Not Attached Via 3GPP Access", 3GPP TSG-SA2 Meeting #112, S2-153826, (Nov. 16-20, 2015), 3 pages.
U.S. Appl. No. 16/069,746, filed Jul. 12, 2018, U.S. Pat. No. 10,555,158, Patented.
U.S. Appl. No. 16/718,968, filed Dec. 18, 2019, U.S. Pat. No. 10,848,950, Patented.
Office Action for Brazilian Application No. BR112018014343-0 dated Feb. 19, 2024, 6 pages.
Notice of Allowance for Vietnamese Application No. 1-2018-03359 dated Mar. 27, 2024, 2 pages.
Office Action for Singapore Application No. 10202102016W dated Apr. 15, 2024, 4 pages.
International Preliminary Report on Patentability and Written Opinion dated Jul. 17, 2018, issued in corresponding International Application No. PCT/EP2017/050587.
Alcatel-Lucent et al; "Additional ePDG selection considerations and corrections", 3GPP Draft; C1-160125, XP051049057.
Alcatel-Lucent et al; "Visiting network configuration for ePDG selection", 3GPP Draft; C1-154347, XP050997671.
Schulzrinne Columbia U B Rosen Marconi H: "Emergency Services for Internet Telephony Systems; draft-schulzrinne-sipping-emergency-arch-00.txt", Feb. 8, 2004, XP015035061.
"3rd Generation Partnership Project; Technical Specification Group Services and System Aspects; Study on S8 Home Routing Architecture for VoLTE (Release 14)", 3GPP Standard; 3GPP TR 23.749, 3rd Generation Partnership Project (3GPP), Mobile Competence Centre ; 650, Route Des Lucioles ; F-06921 Sophia-Antipolis Cedex ; France, (Dec. 1, 2015), vol. SA WG2, No. 1.0.0, pp. 1-30, XP051046310 [YD] 19 * pp. 11, 12.
Alcatel-Lucent et al, "How P-CSCF can detect emergency numbers in a VPLMN", vol. SA WG2, No. Saint Kitts, KN; Jan. 25, 2016-Jan. 29, 2016, (Jan. 17, 2016), 3GPP Draft; S2-160120 S8HR EN in a VPLMN V0.0, 3rd Generation Partnership Project (3GPP), Mobile Competence Centre ; 650, Route Des Lucioles; F-06921 Sophia-Antipolis Cedex ; France, URL: http://www.3gpp.org/ftp/Meetings_3GPP_SYNC/SA2/Docs/, (Jan. 17, 2016), XP051059776 [XP] 18-20 * p. 1 *.
Alcatel-Lucent et al, "ePDG selection enhancements for the support of Lawful Interception", vol. SA WG2, No. Saint Kitts and Nevis, KN; Jan. 25, 2016-Jan. 29, 2016, (Jan. 19, 2016), 3GPP Draft; S2-160186-CR23402R13 EPDG Selection_V2, 3rd Generation Partnership Project (3GPP), Mobile Competence Centre ; 650, Route Des Lucioles ; F-06921 Sophia-Antipolis Cedex ; France, URL: http://www.3gpp.org/ftp/tsg_sa/WG2_Arch/TSGS2_113_St_Kitts/Docs/, (Jan. 19, 2016), XP051072088 [XP] 1-17.
Office Action for European Application No. 16305032.1 dated May 21, 2019.
Office Action for European Application No. 16305032.1 dated Jun. 25, 2018.
Extended European Search Report for European Application No. 16305032.1 dated Oct. 19, 2016.
Partial European Search Report for European Application No. 16305032.1 dated Jul. 8, 2016.
Russian Office Action and Search Report dated Mar. 1, 2019 issued in corresponding Russian Application No. 2018125956/08(041056) (with translation).
Decision of Intent to Grant European Application No. 16305032.1 dated Oct. 29, 2019.

* cited by examiner

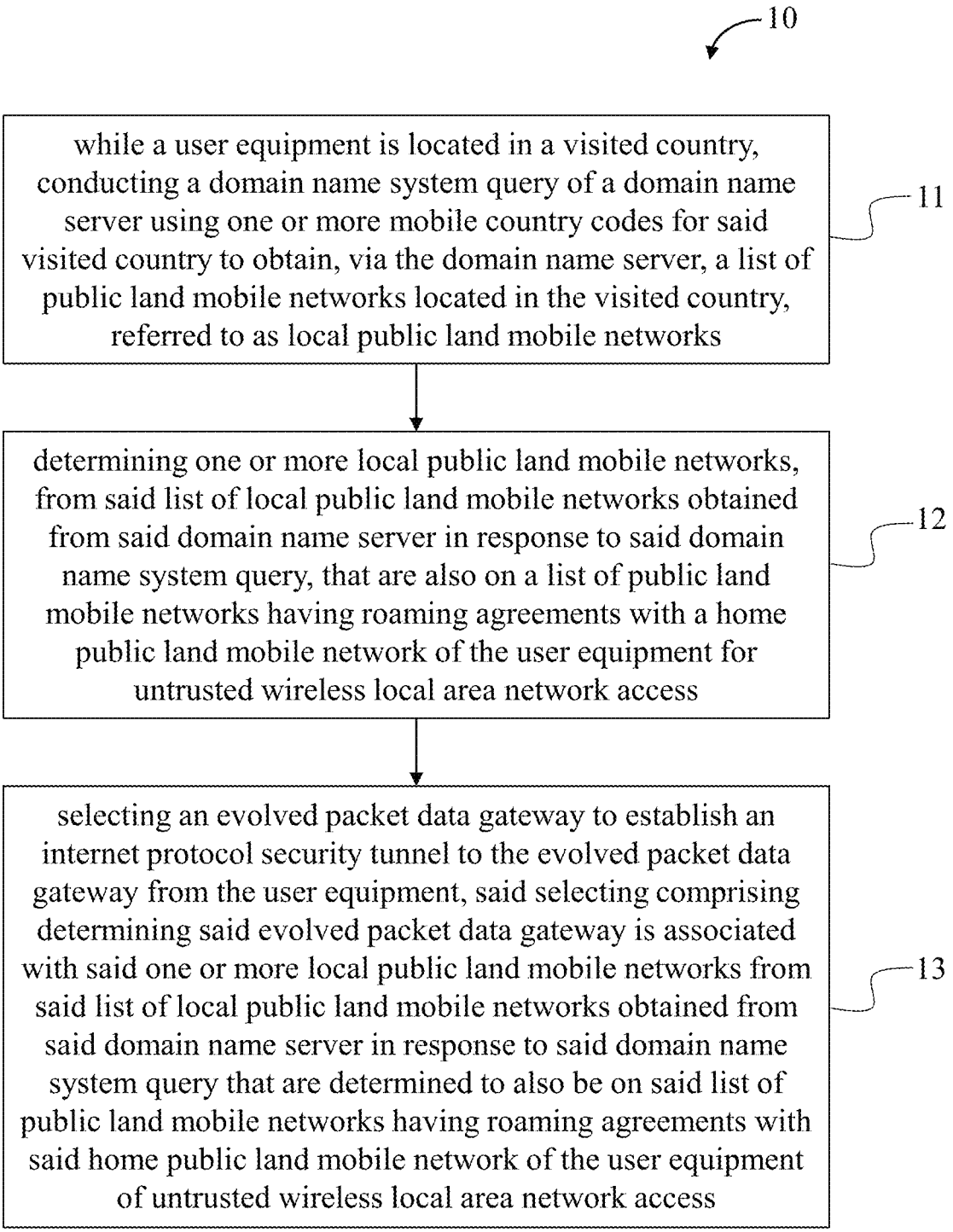
FIG. 4 (NEW)

ENHANCEMENTS TO SERVING A USER EQUIPMENT IN A VISITED COUNTRY IN A MOBILE COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a reissue of U.S. Pat. No. 10,555,158, which issued on Feb. 4, 2020 and is entitled "Enhancements to Serving a User Equipment in a Visited Country in a Mobile Communication System, which was a National Phase Entry under 35 U.S.C. § 371 of International Application No. PCT/EP2017/050587, which has an International filing date of Jan. 12, 2017, which claims priority to European Patent Application No. 16305032.1, filed Jan. 14, 2016, the entire contents of each of which are hereby incorporated herein by reference in their entireties for all purposes.

BACKGROUND

Descriptions of mobile networks and systems can be found in the literature, such as in particular in Technical Specifications published by standardization bodies such as for example 3GPP (3rd Generation Partnership Project).

BRIEF SUMMARY

An example of 3GPP mobile system is EPS (Evolved Packet System). In a system such as EPS, a User Equipment UE has access to a an EPS network providing communication services (including providing IP connectivity). The EPS network comprises a Core Network called EPC (Evolved Packet Core) that can be accessed not only by 3GPP access, but also by non-3GPP access. A typical example of non-3GPP access, which will be considered more particularly in the following, is WLAN access.

WLAN access to EPC is specified in particular in 3GPP TS 23.402 and 3GPP TS 24.302. In the case of untrusted WLAN access, an IPsec tunnel is established between the UE and an evolved Packet Data Gateway ePDG, to ensure that the UE and the network can communicate in a secure way. The procedure for selection of an ePDG by the UE is specified in particular in 3GPP TS 23.402 and 3GPP TS 24.302.

It is important that an appropriate ePDG is selected for untrusted WLAN access to EPC. As recognized by the inventors and as will be explained with more detail later, the procedure for selection of an ePDG by the UE, as currently specified, needs to be improved.

In particular, there is a need to improve the selection of a ePDG in a country a User Equipment UE is located.

There is also a need to improve the determination of the local emergency numbers in a country a User Equipment UE is located.

More generally, there is a need for enhancements to serving a User Equipment UE in a visited country in a mobile communication system.

Embodiments of the present invention in particular address such needs.

The present invention generally relates to mobile communication networks and systems.

These and other objects are achieved, in one aspect, in some embodiments, by a User Equipment UE, configured to:

- get ePDG selection information configured by the UE's HPLMN, said ePDG selection information including a list of PLMNs with an indication of whether the selection of an ePDG in a PLMN is preferred or mandatory or non-preferred,
- perform selection of an ePDG operated by a PLMN of a country the UE is located in, referred to as local PLMN, which has roaming agreement with the UE's HPLMN for untrusted WLAN access to EPC, based on said list of PLMNs configured in said ePDG selection information, and on a list of MCCs of said country and/or a list of local PLMNs.

These and other objects are achieved, in another aspect, in some embodiments, by a User Equipment UE, configured to:

- get a list of PLMNs, referred to as local PLMNs, of a country the UE is located in,
- perform selection of an ePDG operated by a local PLMN having roaming agreement with the UE's HPLMN for untrusted WLAN access to EPC, based on said list of local PLMNs, and on information, referred to as local PLMN roaming agreement information, indicating if a local PLMN has roaming agreement with the UE's HPLMN for untrusted WLAN access to EPC.

These and other objects are achieved, in another aspect, in some embodiments, by a User Equipment UE, configured to:

- get a list of PLMNs, referred to as local PLMNs, of a country the UE is located in, which have roaming agreement with the UE's HPLMN for untrusted WLAN access to EPC,
- perform selection of a ePDG operated by a local PLMN having roaming agreement with the UE's HPLMN for untrusted WLAN access to EPC, based on said list.

These and other objects are achieved, in another aspect, in some embodiments, by a DNS Server, configured to:

- receive a DNS query targeting a FQDN including a MCC of a country,
- provide in response a list of identities, MCC and MNC, of PLMNs of said country.

These and other objects are achieved, in another aspect, in some embodiments, by a DNS Server, configured to:

- receive a DNS query targeting a FQDN including:
  - the MCC and MNC of a local PLMN in a UE's visited country, and
  - the MCC and MNC of the UE's HPLMN,
- provide in response a failure indication if said local PLMN has no roaming agreement with the UE's HPLMN for untrusted WLAN access to EPC.

These and other objects are achieved, in another aspect, in some embodiments, by a DNS Server, configured to:

- receive a DNS query targeting a FQDN including:
  - the MCC and MNC of a UE's HPLMN, and
  - a MCC of a country the UE is located in,
- provide in response a list of identities, MCC and MNC, of the PLMNs of said country, which have roaming agreement with the UE's HPLMN for untrusted WLAN access to EPC.

These and other objects are achieved, in another aspect, in some embodiments, by a method for selection of an evolved packet data gateway in a country a User Equipment UE is located, comprising at least one step performed by at least one of a thus configured UE or DNS server.

These and other objects are achieved, in another aspect, in some embodiments, by a DNS Server, configured to:

receive a DNS query targeting a FQDN including a MCC of a country, provide in response a list of emergency numbers of said country.

These and other objects are achieved, in another aspect, in some embodiments, by a P-CSCF, configured to:

retrieve from a DNS server, based on the MCC of the VPLMN serving an UE, the list of emergency numbers defined in the country corresponding to that MCC.

These and other objects are achieved, in another aspect, in some embodiments, by a method for the determination of the local emergency numbers in a country a User Equipment UE is located, comprising at least one step performed by at least one of a thus configured P-CSCF or DNS server.

BRIEF SUMMARY OF THE DRAWINGS

Some embodiments of apparatus and/or methods in accordance with embodiments of the present invention are now described, by way of example only, and with reference to the accompanying drawings, in which:

FIG. 4 is intended to illustrate, in a simplified way, an example of a method for ePDG selection according to examples embodiments of the invention disclosed herein.

ABBREVIATIONS

Figure 1:
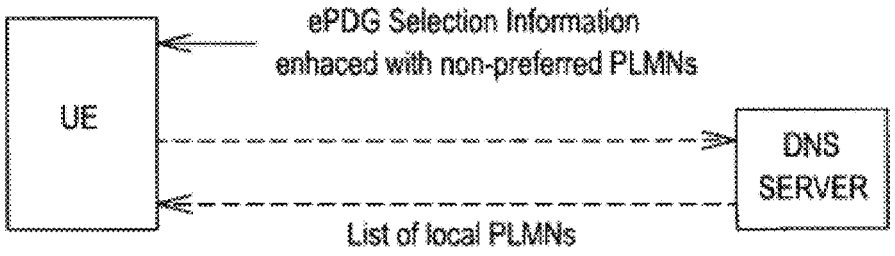
FIG. 1 is intended to illustrate, in a simplified way, an example of information used for ePDG selection according to first embodiments of the invention.

DNS Domain Name System
EPC Evolved Packet Core
ePDG Evolved Packet Data Gateway
EPS Evolved Packet System
FQDN Fully Qualified Domain Name
HPLMN Home PLMN
IMS IP Multimedia Subsystem
MCC Mobile Country Code
MNC Mobile Network Code
P-CSCF Proxy Call Session Control Function
PLMN Public Land Mobile Network
UE User Equipment
VPLMN Visited PLMN
WLAN Wireless Local Area Network

DETAILED DESCRIPTION

When a WLAN capable UE is attached via 3GPP access to a 3GPP RPLMN (HPLMN or VPLMN), it is specified according to TS 23.402 clause 4.5.4 (see version v13.4.0) that the UE selects an ePDG in that RPLMN or in its HPLMN.

When the UE is not attached via 3GPP access to a 3GPP PLMN, it is specified that the UE shall select an ePDG in the country it is located in by constructing a corresponding Operator Identifier FQDN (with MCC and MNC as specified in TS 23.003). But a condition is that the selected PLMN shall be in the "ePDG selection information" (see 4.5.4.4 bullet 2)a)), which does not include all the PLMNs that have roaming agreements for untrusted WLAN with the UE's HPLMN but only the mandatory and preferred PLMNs (i.e. the local PLMNs for which the HPLMN has decided it is mandatory or preferred that the UE selects an ePDG in that PLMN). That "ePDG selection information" has been previously provided to the UE by its HPLMN.

For Lawful Interception, local country regulation authorities may mandate that a UE in the country must select an ePDG in that country. In that case the algorithm to select an ePDG must remain independent from information from other countries. This includes not relying on the "ePDG selection information" because this information is provided by the HPLMN (and may contradict the requirement to select an ePDG in the visited country).

Another use case when the UE must select an ePDG in the same country it is located in is for emergency calls via WiFi when the UE is not attached to any 3GPP PLMN.

In some embodiments:

The UE is assumed to be able to determine the country it is located in. The idea is to enable a WLAN capable UE to get via new additional information in the ePDG selection information and/or via one or more DNS queries, a list of "local" PLMN's (i.e. PLMN's that are in the country the UE is located in) which have roaming agreements for untrusted WLAN access with the UE's HPLMN i.e. that own one or more ePDGs that can authenticate and authorize UE(s) from the HPLMN of the UE.

The DNS servers are public (accessible from anywhere on the Internet).

With the knowledge of local PLMN's having roaming agreements for untrusted WLAN access with the UE's HPLMN, the UE can attempt to establish an IPSec tunnel per TS 24.302 subclause 7.2.2 to an ePDG that is operated by one of these PLMN's.

Three alternatives, referred to as Alternative 1, Alternative 2, Alternative 3, may be distinguished.

Embodiments and/or aspects of the invention related to these different alternatives may be described in the following way.

Alternative 1

One alternative is to extend the attributes of each PLMN in the ePDG selection info "mandatory, preferred" with "not preferred". This allows knowing which PLMNs have roaming agreements with the UE's HPLMN.

In this alternative, either the UE already knows the list of MCCs of the country it is located in, or it needs to query a public DNS to get the full list of PLMNs (MCC and MNC) of the country. The corresponding DNS records are managed by a central administration.

The input is a FQDN which includes the MCC (or one of the MCCs) of the country the UE is located in. The output is the list of the identities of the PLMN's of the country (MCC and MNC). The Resource Record is a NAPTR record.

Then the UE attempts to establish an IPSec tunnel per TS 24.302 subclause 7to an ePDG that is operated by any PLMN in the above list only if the PLMN is configured in the ePDG selection Info.

This alternative implies dependence from the HPLMN because ePDG Selection Info is provided by the HPLMN, but it avoids a subsequent DNS query as in alternative 2. If—due to misconfiguration—a PLMN is not provided by the HPLMN in the ePDG selection info, the UE will just not attempt to select ePDG in that PLMN, but it does not harm because the UE will not attempt to select an ePDG in its HPLMN.

Alternative 2

Similar to alternative 1 but the ePDG selection info is not enhanced with "not preferred". In this case, the UE does not know all the roaming agreements since the ePDG selection info does not contain the "non-preferred PLMNs".

The UE first queries a public DNS to get the list of local PLMNs (MCC and MNC) of the country exactly as in alternative 1 but even if it knows all the MCCs of the country.

There is a need for a second set of (DNS) queries to keep only the list of local PLMN's that have roaming agreements for untrusted WLAN access with the UE's HPLMN (so as to prune out the local PLMN that haven't such agreement within the list of PLMN retrieved by the first query of alternative 1).

This second set of queries corresponds to DNS queries targeting a FQDN which includes:

The MCC and the MNC of a local PLMN in the visited country;

The MCC and the MNC of the UE's HPLMN.

The output of the each DNS query on each local PLMN is

A failure if the local PLMN has no roaming agreements for untrusted WLAN access with the UE's HPLMN;

an FQDN (that may depend on the UE's HPLMN) that allows to further obtain a list of ePDGs of the local PLMN that can serve users of the HPLMN. This avoids the VPLMN having to configure the list of ePDG IP addresses for each of the HPLMN it has roaming agreement with.

Alternative 3

Another alternative is for the UE to directly query a DNS that returns the list of PLMNs which have a roaming agreement for untrusted WLAN with the UE's HPLMN.

The input of the DNS is a FQDN which includes:

The MCC and the MNC of the UE's HPLMN;

The MCC (or one of the MCCs) of the country the UE is located in (it is assumed that the UE can know the country it is located in).

The output of the DNS is a list of the identities (MCC and MNC) of the PLMNs of the country that have roaming agreements for untrusted WLAN access with the UE's HPLMN. That list can be ordered.

This feature is e.g. to be used when the UE has received instructions that in the local country where it is currently camping it shall only use ePDG that are local in the country (allowing thus Lawful Interception in the local country)

or for emergency calls via WLAN.

Embodiments and/or aspects of the invention related to these different alternatives may further be described in the following way.

When a WLAN capable UE can determine the country it is located in and either the UE is attempting to make an emergency call via WiFi or the UE has received instructions that in the country where it is currently camping it shall only use ePDG that are located in the country, and if the UE is not attached via 3GPP access to a 3GPP PLMN (or if the UE has failed to be served by an ePDG of the RPLMN that serves it over 3GPP access), the UE selects an ePDG in a PLMN in this country as follows:

As a first alternative:

1) As a first aspect of the invention, in some embodiments, this alternative assumes that the attribute of each PLMN in the ePDG selection info specified in TS 23.402 (§ 4.5.4.3) "mandatory", "preferred" is enhanced with the value "not preferred". A "not preferred" PLMN configured in the ePDG selection information is a PLMN for which the selection of an ePDG in the VPLMN is allowed (if the UE is required to select a local ePDG) but for which the selection of an ePDG in the HPLMN is preferred (if the UE is not required to select a local ePDG);

2) The UE detects the country it is located in and determines one of the MCCs of the country (a country may have several MCCs) https://fr.wikipedia.org/wiki/Mobile_country_code);

3) As a second aspect of the invention, in some embodiments, the UE optionally (e.g. if it does not know the list of MCCs of the country) tries to get a list of local PLMN's (i.e. a list of PLMNs in the country the UE is located in) by performing a DNS query on an input FQDN containing "mcc<MCC>" to a public NAPTR DNS server that returns a list of FQDN that each contains a "mnc<MNC>.mcc<MCC>" of a local PLMN; The domain of the input FQDN does not correspond to an individual operator as the corresponding DNS record is likely not to be managed by an individual operator (could be managed by GSMA);

4) The UE attempts to establish an IPSec tunnel per TS 24.302 subclause 7 to an ePDG that is operated by any PLMN in the above list only if the local PLMN is configured in the ePDG selection Info (since ePDG roaming is "guaranteed" with the PLMN's in ePDG selection info);

3GPP TS 23.003 provides an informative annex D "Applicability and use of the "0.3gppnetwork.org" domain name" that can be used to construct a FQDN. A rule of this annex is that a DNS managed by an operator identified by mnc<MNC>.mcc<MCC> can be reached by an UE by using a FQDN with the form "<service_id>.mnc<MNC>.mcc<MCC>.pub.3gppnetwork.org". Hence, a public DNS that is not managed by a specific operator should use another form.

As an example for that alternative, the input FQDN to be used for the DNS query would have the form "mcc<MCC>.local-plmn.pub.3gppnetwork.org", the public DNS server returning a list of "mnc<MNC>.mcc<MCC>.local-plmn.pub.3gppnetwork.org" output FQDNs.

Note that in case multiple MCC values may correspond to the local country, the MCC value in an output FQDN could have a different value than the MCC value in the input FQDN.

An example of information used for ePDG selection by a UE, in embodiments related to the first alternative, is illustrated in FIG. 1. In FIG. 1, such information includes ePDG selection information enhanced with non-preferred PLMNs, and may (as illustrated with dotted lines) include a list of local PLMNs, obtained e.g. by DNS query to a public DNS server.

As a second alternative,

1) This alternative assumes that the attributes of each PLMN in the ePDG selection info "mandatory, preferred" are as specified in TS 23.402;

2) Same as step 2) in alternative 1;

3) Same as step 3) in alternative 1 in order to determine a list of local PLMN;

4) The UE attempts to establish an IPSec tunnel per TS 24.302 subclause 7. to an ePDG that is operated by any PLMN in the above list if the PLMN is configured in the ePDG selection Info (since ePDG roaming is "guaranteed" with the PLMN's in ePDG selection info);

5) If there is no PLMN in the list returned by the DNS server that is also indicated in the ePDG selection info, or if the UE did not succeed in establishing an IPsec tunnel to an ePDG in step 4, the UE tries to get a list of local ePDG's having a roaming agreement with its HPLMN:

a. The UE removes the local PLMN(s) that it has tried to contact at step 3;

b. For each of the remaining local PLMN(s), the UE performs a DNS query to the local PLMN NAPTR DNS server with an FQDN including the UE's HPLMN (hmnc<MNC>.hmcc<MCC>) and the local PLMN ID (mnc<MNC>.mcc<MCC>). Since the DNS is managed by the operator, the FQDN would have a format like "epdg.hmnc<MNC>.hmcc<MCC>.mnc<MNC>.mcc<MCC>.pub.3gppnetwork.org". The DNS server returns a substitute FQDN e.g. in a "s" NAPTR record if there is a roaming agreement with the HPLMN, and a rejection otherwise. If the UE "resolver" gets a substitute FQDN from the DNS server, it issues a second DNS request (e.g. SRV type) with the substitute FQDN. The output is a list of IP addresses or a SRV record for ePDG depending on whether the substitute FQDN is associated with an "a" or "s" record.

Step b allows avoiding costly failed IPSec establishment attempts from the UE where the UE tries to contact an ePDG of a local PLMN which has no roaming agreement for untrusted WLAN with the UE's HPLMN (IKE-SA-INIT+Authentication signaling, generally up to the 3GPP AAA proxy which sum up to 6 useless messages).

6) The UE attempts to establish an IPSec tunnel per TS 24.302 subclause 7 to an ePDG that is operated by one of these PLMN's.

Figure 2:
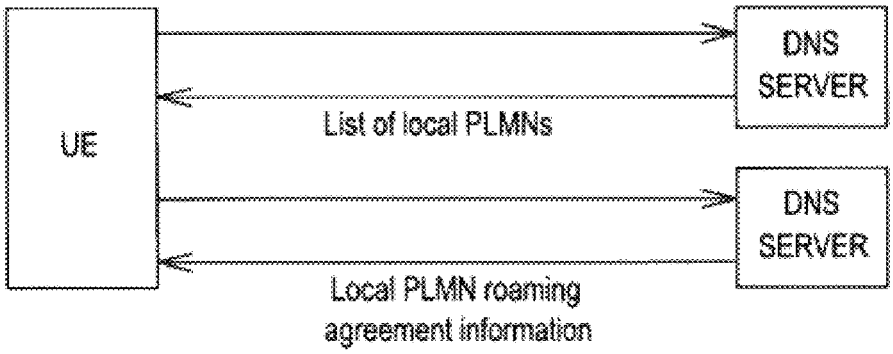
FIG. 2 is intended to illustrate, in a simplified way, an example of information used for ePDG selection according to second embodiments of the invention.

An example of information used for ePDG selection by a UE, in embodiments related to the second alternative, is illustrated in FIG. 2. In FIG. 2, such information includes a list of local PLMNs obtained e.g. by DNS query to a public DNS server, and information noted local PLMN roaming agreement information (indicating if a local PLMN has roaming agreement with the UE's HPLMN for untrusted WLAN access to EPC) obtained e.g. by DNS query to a local PLMN DNS server.

As a third alternative, the UE selects an ePDG in a PLMN in the country it is located in as follows:

1) The UE detects the country it is located in and determines one of the MCCs of the country;

2) The UE tries to get a list of local PLMNs having an ePDG roaming agreement with its HPLMN by performing a DNS query to a local DNS server with an FQDN including the UE's HPLMN (hmnc<MNC>.hmcc<MCC>) and the local country MCC (mcc<MCC>) it has determined in step1 (there may be several MCCs in a country). The DNS server returns a list of PLMNs (mnc<MNC>.mcc<MCC>) which have roaming agreements for untrusted WLAN with the UE's HPLMN;

3) The UE attempts to establish an IPSec tunnel per TS 24.302 subclause 7 to an ePDG that is operated by one of these PLMN's.

TS 23.003 provides an informative annex D "Applicability and use of the "0.3gppnetwork.org" domain name" that can be used to construct a FQDN. As an example, in that third alternative, the FQDN would have the form "hmnc<MNC>.hmcc<MCC>.mcc<MCC>.lcepdg.pub.3gppnetwork.org", where the service is local country ePDG (lcepdg), the MCC of the country the UE is located in is mcc, and the UE's HPLMN is hmcc plus hmnc.

The DNS is configured with a list of local PLMN in the country identified by "mcc" the UE's HPLMN has WLAN roaming agreements with. Until successful IPSec tunnel establishment with an ePDG, for each of the local PLMN in the list:

the UE tries to retrieve the identity of an ePDG of that PLMN as if the UE was registered on that local PLMN (using the Operator Identifier FQDN described in 23.402 § 4.5.4.2);

the UE attempts to establish an IPSec tunnel per TS 24.302 subclause 7.

As an implementation example for the third alternative, the UE fetches the NAPTR record associated with "hmnc<MNC>.hmcc<MCC>.mcc<MCC>.lcepdg.pub.3gppnetwork.org." The DNS NAPTR information it gets is a set of NAPTR records:

with the same NAPTR preference and order (to ensure fairness among the operators);

with the "flags" field set to "a" (as according to IETF RC 3403, "The Application defines the flag 'a' to mean a terminal lookup and that the output of the rewrite will be a domain name for which an A record should be queried"). Indeed, the DNS resolver in the UE will use the returned FQDN to get the IP addresses of ePDGs;

not containing any regular expression ("regexp") for substitution (to avoid complex algorithm in the UE);

but containing an NAPTR "replacement" field an Operator Identifier FQDN (as defined in 23.402 § 4.5.4.2) of a VPLMN that supports ePDG roaming with the HPLMN.

The DNS resolver in the UE then needs to pick an Operator Identifier FQDN and issues a DNS lookup towards that new domain in order to find an ePDG of the corresponding local PLMN.

Figure 3:
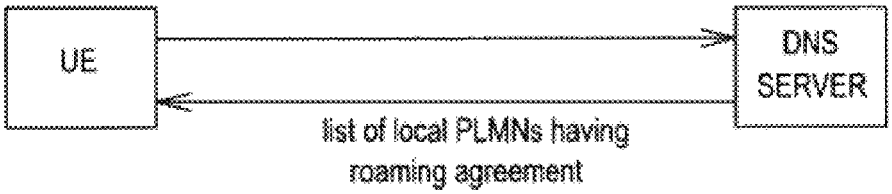
FIG. 3 is intended to illustrate, in a simplified way, an example of information used for ePDG selection according to third embodiments of the invention.

An example of information used for ePDG selection by a UE, in embodiments related to the third alternative, is illustrated in FIG. 3. In FIG. 3, such information includes a list of local PLMNs having roaming agreement with the UE's HPLMN for untrusted WLAN access to EPC (noted list of PLMNs having roaming agreement), obtained e.g. by DNS query to a DNS server.

For all alternatives, a fair usage of the PLMN (s) in the list can be achieved by the DNS providing the list of local PLMNs using NAPTR records having the same order and same preference (per RFC 34.03 definitions), and the DNS resolver in the UE randomly choosing between the PLMNs for which an IPSec tunnel establishment has not been successfully attempted. Another possibility is that the DNS provides a list of local PLMNs in a random or round robin order and that the UE always start with the first PLMN in the list.

Another need to fulfill is related with a P-CSCF (as defined in 3GPP 23.228) in a Home PLMN (HPLMN) that for IMS services needs to serve an UE located a Visited PLMN (VPLMN) of another country (this scenario is studied as part of S8 Home Routed studies in the FS_V8 SID documented in TR 23.749). In that case the P-CSCF in the HPLMN needs to determine whether session signaling initiated by the UE in the VPLMN targets an emergency number defined in that VPLMN (for example the emergency numbers related with child or women abuse may vary from country to country).

When the session signaling initiated by the UE in the VPLMN targets an emergency number defined in that VPLMN, the P-CSCF in HPLMN has to redirect the UE towards selecting a P-CSCF for emergency services in the VPLMN.

For the purpose of detecting whether session signaling initiated by the UE in the VPLMN targets an emergency number defined in that VPLMN, the P-CSCF could be locally configured with the list of emergency numbers associated with each country of a VPLMN with which it has roaming agreements.

This would be cumbersome to manage.

Another simpler solution would be where the P-CSCF takes the MCC of the VPLMN (where the UE is located) to build a specific FQDN associated with the emergency numbers in that country and issues a DNS record request to get the list of the emergency numbers in that country.

As another aspect of the invention, in some embodiments, the P-CSCF tries to get a list of local emergency numbers (i.e. a list of emergency numbers in the country the UE is located in) by performing a DNS query on an input FQDN containing "mcc<MCC>" (of the PLMN where the UE is camping) to a public NAPTR DNS server that returns a list of such emergency numbers; The domain of the input FQDN does not correspond to an individual operator as the corresponding DNS record is likely not to be managed by an individual operator (could be managed by GSMA like the NAPTR record of the public DNS server that returns a list of FQDN that each contains a "mnc<MNC>.mcc<MCC>" of a local PLMN).

The P-CSCF is not assumed to retrieve this list each time an UE registers or issues session related signaling as it may cache the DNS record received as part of DNS look-up Various aspects and/or embodiments of the invention include (though not being limited to) following aspects and/or embodiments.

Some aspects are related to a User Equipment UE.

Various embodiments may be provided, including (though not being limited to) following embodiments, which may be taken alone or in combination, according to various combinations.

In an embodiment said UE is configured to:

get ePDG selection information configured by the UE's HPLMN, said ePDG selection information including a list of PLMNs with an indication of whether the selection of an ePDG in a PLMN is preferred or mandatory or non-preferred.

In an embodiment said UE is configured to:

perform selection of an ePDG operated by a PLMN of a country the UE is located in, referred to as local PLMN, which has roaming agreement with the UE's HPLMN for untrusted WLAN access to EPC, based on said list of PLMNs configured in said ePDG selection information, and on a list of MCCs of said country and/or a list of local PLMNs.

In an embodiment said UE is configured to:

determine said list of MCCs, attempt to establish an IPsec tunnel to an ePDG operated by a PLMN configured in said ePDG selection information, if a MCC of said PLMN is in said list of MCCs.

In an embodiment said UE is configured to:

get said list of local PLMNs, attempt to establish an IPsec tunnel to an ePDG operated by a PLMN of said list of local PLMNs, if said PLMN is configured in said ePDG selection information.

In an embodiment said UE is configured to:

get said list of local PLMNs, via DNS query to a DNS server on an input containing a MCC of the country the UE is located in.

In an embodiment, said UE is configured to:

get a list of PLMNs, referred to as local PLMNs, of a country the UE is located in.

In an embodiment, said UE is configured to:

perform selection of an ePDG operated by a local PLMN having roaming agreement with the UE's HPLMN for untrusted WLAN access to EPC, based on said list of local PLMNs, and on information, referred to as local PLMN roaming agreement information, indicating if a local PLMN has roaming agreement with the UE's HPLMN for untrusted WLAN access to EPC.

In an embodiment, said UE is configured to:

get said list of local PLMNs, via DNS query to a DNS server on an input containing a MCC of the country the UE is located in.

In an embodiment, said UE is configured to:

get said local PLMN roaming agreement information, via DNS query to a DNS server targeting a FQDN including:

the MCC and MNC of said local PLMN, and the MCC and MNC of the UE's HPLMN, the output of said DNS query indicating a failure if said local PLMN has no roaming agreement with the UE's HPLMN for untrusted WLAN access to EPC.

In an embodiment, said UE is configured to:

get a substitute FQDN from said DNS server if said local PLMN has roaming agreement with the UE's HPLMN for untrusted WLAN access to EPC, and issue a second DNS query with the substitute FQDN, to further obtain a list of ePDGs operated by said local PLMN, that can serve users of the UE's HPLMN.

In an embodiment, said UE is configured to:

get ePDG selection information configured by the UE's HPLMN, including a list of PLMNs with an indication of whether the selection of an ePDG in a PLMN is preferred or mandatory, attempt to establish an IPsec tunnel to an ePDG operated by a PLMN of said list of local PLMNs, if this PLMN is configured in the ePDG selection information, if there is no PLMN in said list of local PLMNs that is also configured in said ePDG selection information, or if the UE did not succeed in said attempt to establish said IPsec tunnel, get said local PLMN roaming agreement information.

In an embodiment, said UE is configured to:

get a list of PLMNs, referred to as local PLMNs, of a country the UE is located in, which have roaming agreement with the UE's HPLMN for untrusted WLAN access to EPC.

In an embodiment, said UE is configured to:

perform selection of a ePDG operated by a local PLMN having roaming agreement with the UE's HPLMN for untrusted WLAN access to EPC, based on said list.

In an embodiment, said UE is configured to:

get said list via DNS query to a DNS server.

In an embodiment, said UE is configured to:

perform said ePDG selection if said UE is required to select an ePDG operated by a local PLMN in a country where the UE is located.

Other aspects are related to DNS Server(s).

Various embodiments may be provided, including (though not being limited to) following embodiments, which may be taken alone or in combination, according to various combinations.

In an embodiment, a DNS Server is configured to:

receive a DNS query targeting a FQDN including a MCC of a country, provide in response a list of identities, MCC and MNC, of PLMNs of said country.

In an embodiment, a DNS Server is configured to:

receive a DNS query targeting a FQDN including:

the MCC and MNC of a local PLMN in a UE's visited country, and the MCC and MNC of the UE's HPLMN, provide in response a failure indication if said local PLMN has no roaming agreement with the UE's HPLMN for untrusted WLAN access to EPC.

In an embodiment, a DNS Server is configured to:

provide in response a substitute FQDN if said local PLMN has roaming agreement with the UE's HPLMN for untrusted WLAN access to EPC, said substitute FQDN enabling said UE to get a list of ePDGs of said local PLMN that can serve users of the UE's HPLMN.

In an embodiment, a DNS Server is configured to:

receive a DNS query targeting a FQDN including:

the MCC and MNC of a UE's HPLMN, and a MCC of a country the UE is located in, provide in response a list of identities, MCC and MNC, of the PLMNs of said country, which have roaming agreement with the UE's HPLMN for untrusted WLAN access to EPC.

Other aspects are related to a method for selection of an evolved packet data gateway in a country a User Equipment UE is located, comprising at least one step performed by at least one of a thus configured UE or DNS server.

Other aspects are related to a DNS Server.

Various embodiments are provided, including:

In an embodiment, said DNS Server is configured to:

receive a DNS query targeting a FQDN including a MCC of a country, provide in response a list of emergency numbers of said country.

Other aspects are related to a P-CSCF.

Various embodiments are provided, including:

In an embodiment, said P-CSCF is configured to:

retrieve from a DNS server, based on the MCC of the VPLMN serving an UE, the list of emergency numbers defined in the country corresponding to that MCC Other aspects are related to method for the determination of the local emergency numbers in a country a User Equipment UE is located, comprising at least one step performed by at least one of a thus configured P-CSCF or DNS server.

Referring now to FIG. 4, a method 10 is illustrated that comprises: while a user equipment is located in a visited country, conducting a domain name system query of a domain name server using one or more mobile country codes for said visited country to obtain, via the domain name server, a list of public land mobile networks located in the visited country, referred to as local public land mobile networks, at 11. The method 10 further comprises: determining one or more local public land mobile networks, from said list of local public land mobile networks obtained from said domain name server in response to said domain name system query, that are also on a list of public land mobile networks having roaming agreements with a home public land mobile network of the user equipment for untrusted wireless local area network access, at 12. The method 10 further comprises: selecting an evolved packet data gateway to establish an internet protocol security tunnel to the evolved packet data gateway from the user equipment, said selecting comprising determining said evolved packet data gateway is associated with said one or more local public land mobile networks from said list of local public land mobile networks obtained from said domain name server in response to said domain name system query that are determined to also be on said list of public land mobile networks having roaming agreements with said home public land mobile network of the user equipment of untrusted wireless local area network access, at 13.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:

at least one processor; and at least one memory [including computer program code;] *storing instructions thereon that, when executed by the at least one processor, cause the apparatus to perform at least:*

[the at least one memory and the computer program code configured to, with the at least one processor, cause the apparatus at least to, determine a country in which the apparatus is visiting and one or more mobile country codes for said country;]

while said apparatus is located in [said] *a visited* country, [conduct] *conducting* a domain name system query of a domain name server [located in said country] using [said] one or more mobile country codes *for said visited country* to obtain, *via the domain name server,* a list of *identities of* public land mobile networks [of] *located in* the *visited* country [in which the apparatus is visiting], referred to as local public land mobile networks;

[determine] *determining* one or more local public land mobile networks, from said list of *identities of* local public land mobile networks obtained from said *domain name server in response to said* domain name system query, *the identities of which* are also on a list of *identities of* public land mobile networks having roaming agreements with a home public land mobile network of the apparatus for untrusted wireless local area network access; and

[select] *selecting* an evolved packet data gateway to establish an internet protocol security tunnel to the evolved packet data gateway from the apparatus, said [select] *selecting* comprising determining said evolved packet data gateway is associated with said one or more *local* public land mobile networks, *from said list of local public land mobile networks obtained from said domain name server in response to said domain name system query that are determined to also be on said list of public land mobile networks having roaming agreements with said home public land mobile network of the apparatus of untrusted wireless local are network access*.

2. An apparatus according to claim 1, *wherein the instructions stored on* the at least one memory [and the computer program code configured to, with the at least one processor, cause the apparatus at least to], *when executed by the at least one processor, further cause the apparatus to perform at least*:

[perform] *performing* the selecting by selecting the evolved packet data gateway operated by [the] *said* one [of the]*or more* local public land mobile networks[of said list,], if [the] *said* one [of the] *or more* local public land mobile networks [of the list] is configured in evolved packet data gateway selection information [provided to said apparatus by the home public land mobile network of the] *for said* apparatus.

3. An apparatus according to claim 1, *wherein the instructions stored on* the at least one memory [and the computer program code configured to, with the at least one processor, cause the apparatus at least to], *when executed by the at least one processor, further cause the apparatus to perform at least*:

[perform] *performing* the selecting if the apparatus is required to select an evolved packet data gateway operated by a local public land mobile network in the *visited* country[in which the apparatus is located.].

4. A method comprising:

[determining a country in which a user equipment is visiting and one or more mobile country codes for said country;

while said user equipment is located in said country,]

*while a user equipment is located in a visited country,* conducting a domain name system query of a domain name server [located in said country] using [said] one or more mobile country codes *of said visited country* to obtain, *via the domain name server,* a list of *identifies of* public land mobile networks [of] *located in* the *visited* country[in which the user equipment is visiting, ],referred to as local public land mobile networks;

[determine] *determining* one or more local public land mobile networks, from said list of *identities of* local public land mobile networks obtained from said *domain name server in response to said* domain name system query, *the identities of which* are also on a list of *identities of* public land mobile networks having roaming agreements with a home public land mobile network of the user equipment for untrusted wireless local area network access; and selecting an evolved packet data gateway to establish an internet protocol security tunnel to the evolved packet data gateway from the user equipment, said selecting comprising determining said evolved packet data gateway is associated with said one or more *identities of local* public land mobile networks *from said list of local public land mobile networks obtained from said domain name server in response to said domain name system query that are determined to also be on said list of public land mobile networks having roaming agreements with said home public land mobile network of the user equipment of untrusted wireless local area network access*.

5. A method according to claim 4, wherein the selecting the evolved packet data gateway *comprises selecting as the evolved packet data gateway, a packet data gateway* which is operated by [the] *said* one [of the] *or more identities of* local public land mobile networks [of said list is performed by selecting the evolved packet data gateway, if the], *wherein said* one [of the] *ore more identities of* local public land mobile networks [of the list] is configured in evolved packet data gateway selection information [provided to] *obtained by* said user equipment [by] *from* the home public land mobile network of the user equipment.

6. A method according to claim 4, *further* comprising:

performing said evolved packet data gateway selection [if] *based on* said user equipment [is] *being* required to select an evolved packet data gateway operated by [the] *said* one *or more* of the local public land mobile networks of the list in the *visited* country [in which the user equipment is located.]

7. A computer program product comprising a non-transitory computer-readable medium storing instructions, said instructions configured, upon execution, to cause at least:

[determining a country in which a user equipment is visiting and one or more mobile country codes for said country;

while said user equipment is located in said country,]

*while a user equipment is located in a visited country,* conducting a domain name system query of a domain name server [located in said country] using [said] one or more mobile country codes *of said visited country* to obtain, *via the domain server,* a list of *identities of* public land mobile networks [of] *located in* the *visited* country [in which the user equipment is visiting,], referred to as local public land mobile networks;

[determine] *determining* one or more local public land mobile networks, from said list of *identities of* local public land mobile networks obtained from said *domain name server in response to said* domain name system query, *the identities of which* are also on a list of *identities of* public land mobile networks having roaming agreements with a home public land mobile network of the user equipment for untrusted wireless local area network access; and selecting an evolved packet data gateway to establish an internet protocol security tunnel to the evolved packet data gateway from the user equipment, said selecting comprising determining said evolved packet data gateway is associated with said one or more *local* public land mobile networks *from said list of local public land mobile networks obtained from said domain name server in response to said domain name system query that are determined to also be on said list of public land mobile networks having roaming agreements with said home public land mobile network of the user equipment of untrusted wireless local area network access*.

8. A computer program product according to claim 7, wherein the selecting the evolved packet data gateway *comprises selecting as the evolved packet data gateway, a packet data gateway* which is operated by [the] *said* one [of the] *or more* local public land mobile networks [of said list is performed by selecting the evolved packet data gateway, if the], *wherein said* one [of the] *or more* local public land mobile networks [of the list] is configured in evolved packet data gateway selection information [provided to] *obtained by* said user equipment [by] *from* the home public land mobile network of the user equipment.

9. A computer program product according to claim 7, wherein said instructions are further configured, upon execution, to cause at least:

performing said evolved packet data gateway selection [if] *based on* said user equipment [is] *being* required to select an evolved packet data gateway operated by [the] *said* one [of the] *or more* local public land mobile networks of the list in the *visited* country[in which the user equipment is located.].

*10. An apparatus comprising:*

*at least one processor; and*

*at least one memory storing instructions thereon that, when executed by the at least one processor, cause the apparatus to perform at least:*

*conducting a domain name system query of a domain name server using one or more mobile country codes for a visited country in which the apparatus is located, to obtain a list of local public land mobile networks of the visited country in which the apparatus is located;*

*determining one or more local public land mobile networks from said list of local public land mobile networks obtained from said domain name system query are also on a list of public land mobile networks having roaming agreements with a home public land mobile network of the apparatus for untrusted wireless local area network access; and*

*selecting an evolved packet data gateway to establish an internet protocol security tunnel to the evolved packet data gateway from the apparatus based upon a determination that said evolved packet data gateway is associated with said one or more local public land mobile networks.*

* * * * *